US006480374B1

(12) United States Patent
Lee

(10) Patent No.: US 6,480,374 B1
(45) Date of Patent: Nov. 12, 2002

(54) VERTICALLY DISPOSED NOTEBOOK COMPUTER

(75) Inventor: Yung-Tang Lee, Taipei (TW)

(73) Assignee: Inventec Appliances Corp., Taipei (TW)

( * ) Notice: Subject to any disclaimer, the term of this patent is extended or adjusted under 35 U.S.C. 154(b) by 72 days.

(21) Appl. No.: 09/711,301

(22) Filed: Nov. 14, 2000

(51) Int. Cl.[7] .............................. G06F 1/16; H05K 5/02
(52) U.S. Cl. ........................ 361/681; 361/680; 361/683
(58) Field of Search .................. 361/680, 681, 361/683, 686, 724; 312/223.1, 223.2, 223.3

(56) References Cited

U.S. PATENT DOCUMENTS

| 4,680,674 A | * | 7/1987 | Moore | 361/681 |
| 5,157,585 A | * | 10/1992 | Myers | 361/686 |
| 5,247,285 A | * | 9/1993 | Yokota et al. | 345/169 |
| 5,345,362 A | * | 9/1994 | Winkler | 361/681 |
| 5,548,478 A | * | 8/1996 | Kumar et al. | 361/681 |
| 5,900,848 A | * | 5/1999 | Haneda et al. | 345/1 |
| 5,926,364 A | * | 7/1999 | Karidis | 361/681 |

* cited by examiner

*Primary Examiner*—Lynn D. Feild
(74) *Attorney, Agent, or Firm*—Birch, Stewart, Kolasch & Birch, LLP

(57) ABSTRACT

A vertically disposed notebook comprises a case, a monitor parallel slidably coupled to the case being capable of sliding to either face the case for storage or oppose the case for use, and a removable keyboard for being either received into case in a storage position or removed from case in a use position. By utilizing this, the case is not interfered by monitor and keyboard. Also, various advantages are obtained such as smaller use space and the lift of the blocking of the path of heat dissipation.

20 Claims, 6 Drawing Sheets

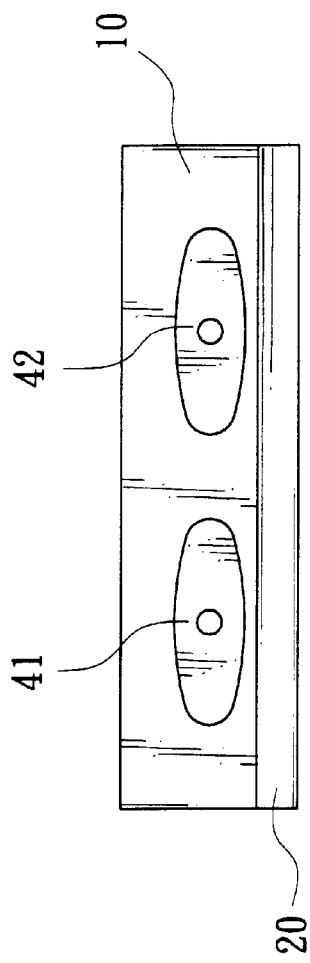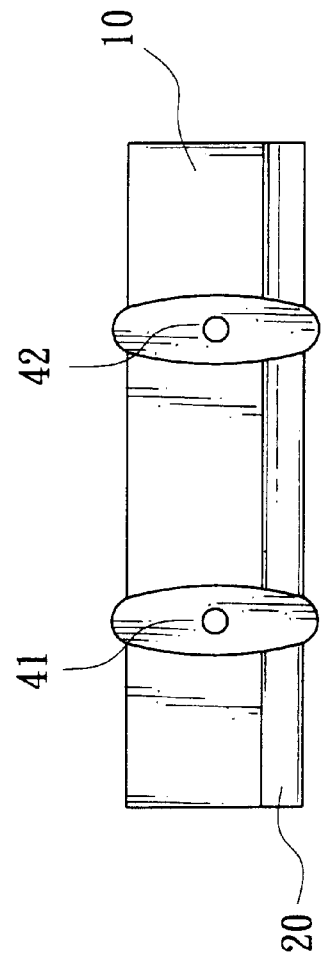

VERTICALLY DISPOSED NOTEBOOK COMPUTER

BACKGROUND OF THE INVENTION

1. Field of Invention

The present invention relates to notebooks and more particularly to a vertically disposed notebook.

2. Related Art

Computers have become indispensable in our daily life. As technology proceeds, computers have evolved from desktop personal computers (PCs) to portable notebooks, hand-held personal computers (HPCs), and personal digital assistants (PDAs). In general, these devices are characterized as slim, easy to carry, and lightweight. As to a notebook, a number of peripherals (e.g., floppy disk drive, CD-ROM, and large display) are incorporated in the notebook, thus having a powerful capability. In comparison with HPC and PDA, they are less powerful than a notebook due the size limitations.

As to a typical notebook, it substantially comprises a case enclosing a motherboard a CPU, a memory unit, a variety of adapters, floppy disk drive(s), and CD-ROM. Notebook further comprises a keyboard fixed onto the case and a monitor hinged to case. As such, monitor may be swung onto case for storage or in the other position wherein monitor is open to be angled with respect to case for ease of operation. In use, user may place notebook on a planar surface (e.g., desk) prior to opening monitor to form a desired angle with respect to case. It is understood that a predetermined area of desk is occupied by case because as stated above, keyboard is fixed onto case. Further, a predetermined height is required for permitting a monitor to open. In view of above, the occupied space is an important factor in considering the convenience while operating the notebook. This thus limits the use of notebook.

As to early desktop computers, they are generally transversely disposed. It is disadvantageous for occupying a large space. As such, recent desktop computers are generally vertically disposed (i.e. Tower) for saving space. But it is not applicable to notebook. This is because, as stated above, a certain space is required while operating notebook as well as the fixed keyboard and the arrangement of monitor. In addition, it is understood that notebooks are popular due to its slim size. As such, CPU, disk drive, and etc. occupy almost all available space inside notebook. Also, the temperature generated by above electronic devices is high during operating. There is almost no gap between the underside and the supported desk. This further blocks the path of heat dissipation. It is known that above high temperature may force user to halt the operation of notebook temporarily after a predetermined time of use for preventing the electronic devices from malfunctioning due to overheat. As an end, manufacturers do not want to incorporate high performance electronic devices into notebook due to the overheat problem. As such, how to solve the overheat problem has become a challenge to notebook manufacturers. In general, notebook manufacturers have spent a lot of time and money on the optimal arrangement of electronic devices and the improvement of fan. But the previous problem is still unsolved because the transversely disposed notebook blocks the path of heat dissipation. Thus, it is desirable to provide a vertically disposed notebook wherein case is not interfered by monitor and keyboard in order to overcome the above drawbacks of prior art.

SUMMARY OF THE INVENTION

It is therefore an object of the present invention to provide a vertically disposed notebook comprising a case containing electronic devices, a monitor parallel slidably coupled to the case being capable of sliding to either face the case for storage or oppose the case for use, and a removable keyboard for being either received into case in a storage position or removed from case in a use position. By utilizing this vertically disposed notebook, the case is not interfered by monitor and keyboard. Also, various advantages are obtained such as smaller use space and the lift of the blocking of the path of heat dissipation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become fully understood from the detailed description given hereinbelow illustration only, and thus are not limitative of the present invention, and wherein:

FIGS. 5A and 5B are plan views illustrating two different orientations of rotatable glide of the FIG. 1 notebook respectively.

DETAILED DESCRIPTION OF THE INVENTION

Figure 1:
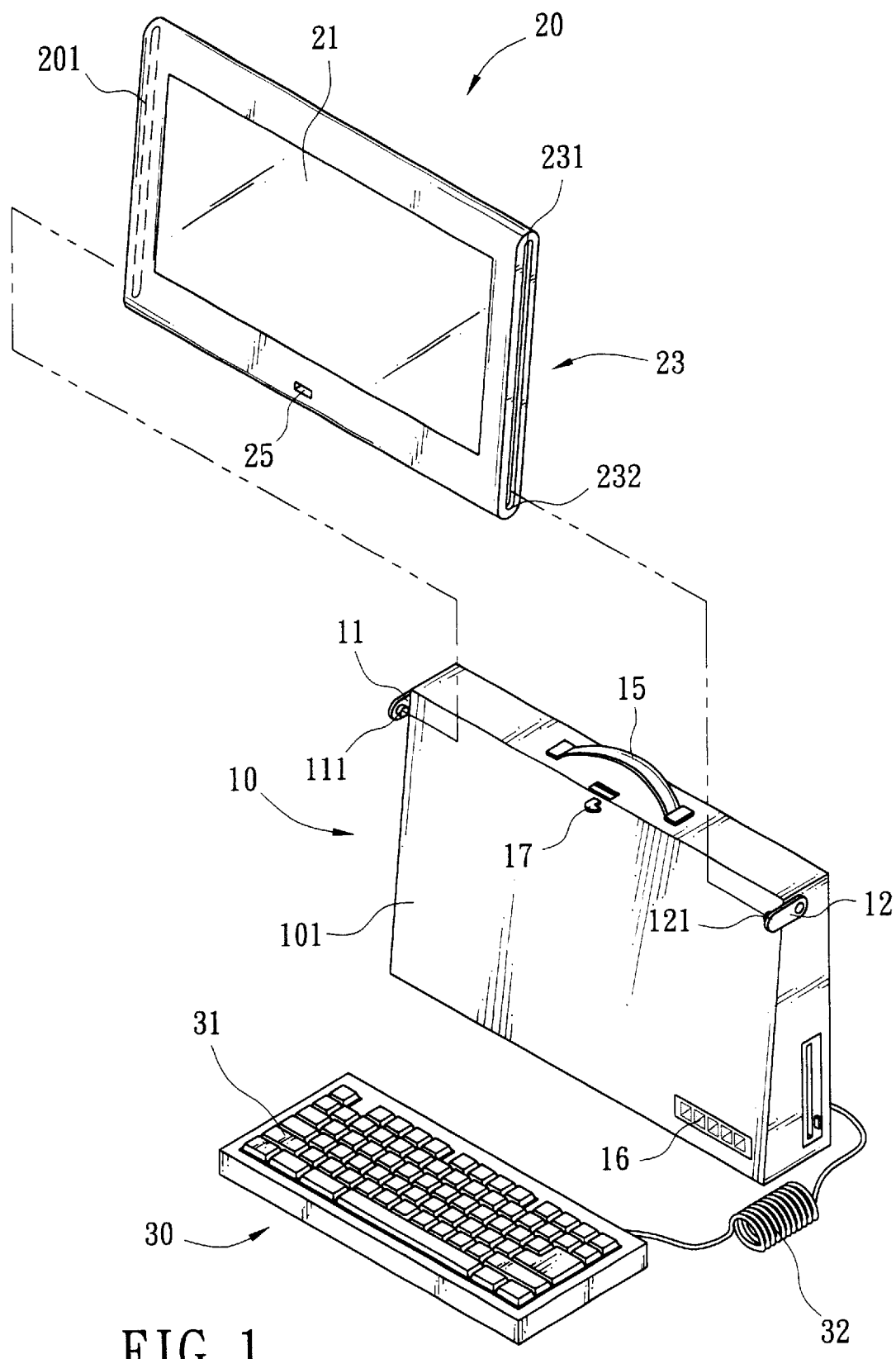
FIG. 1 is an exploded view of vertically disposed notebook according to the invention.
Figure 4:
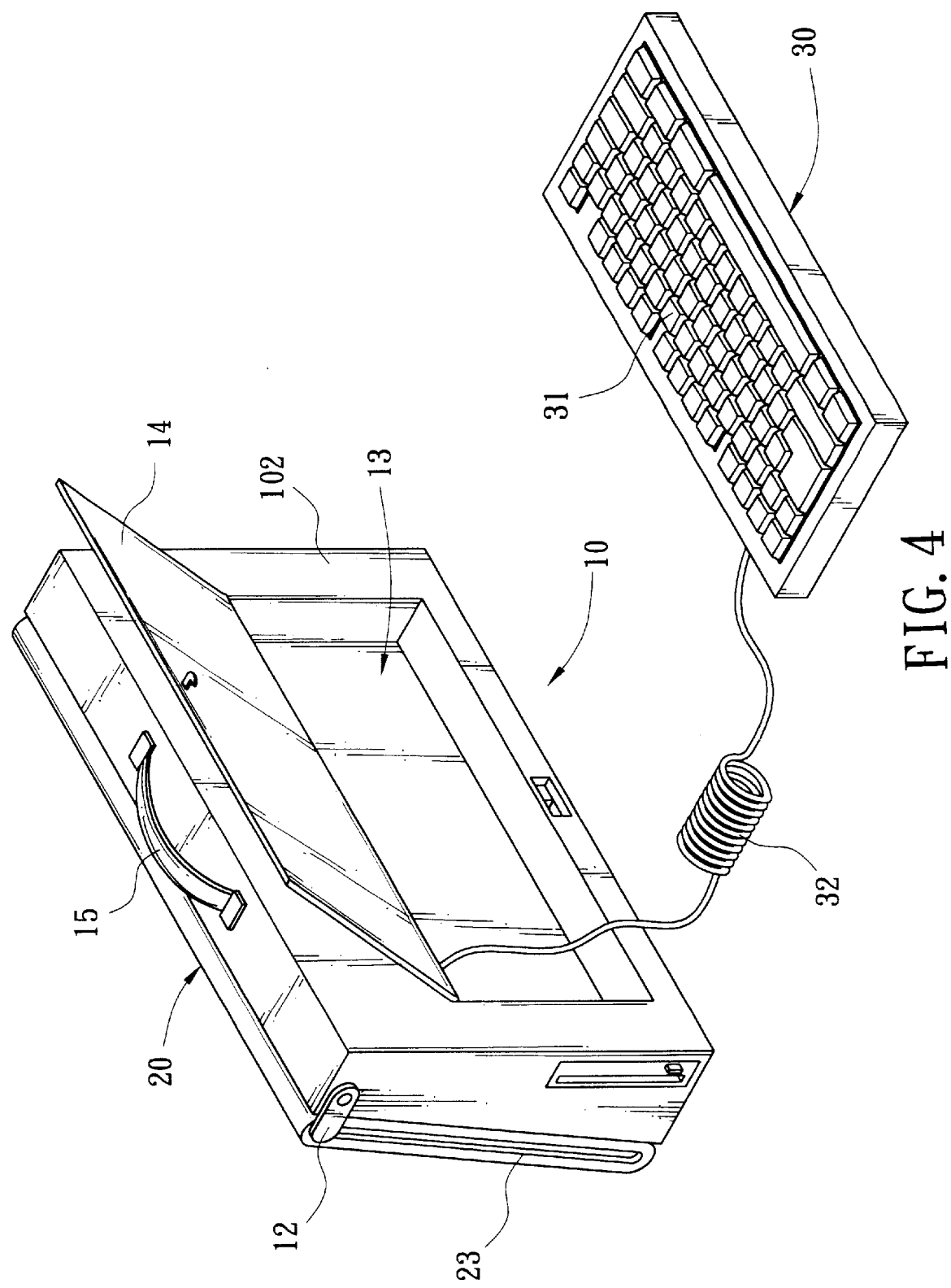
FIG. 4 is another perspective view of the FIG. 3 notebook.

Referring to the drawings and particular to FIG. 1, there is shown a vertically disposed notebook constructed in accordance with the invention. Notebook comprises a case 10 containing electronic devices, a monitor 20, and a keyboard 30. Case 10 is generally a rectangular shaped member and contains CPU, memory unit, floppy disk drive, CD-ROM and various adapters (not shown) for processing or storing data. Two guides 11 and 12 are provided on two opposite sides at the top of case 10. Pegs 111 and 121 are provided on guides 11 and 12 respectively. A recess 13 (see FIG. 4) is provided at the rear 102 of case 10. A cover 14 is hinged to the top side of recess 13. A carrying handle 15 is provided on the top of case 10. Preferably, the front side 101 of case 10 is downward slanted such that the bottom area of case 10 are larger than the top area thereof. A connector assembly 16 is provided near the bottom of the front side 101 of case 10. A pair of rotatable glides 41 and 42 are provided at the underside of case 10 such that glides 41, 42 may be rotated to a storage position (FIG. 5A) or a support position (i.e., perpendicular to case 10 and projected from the underside of case 10) as shown in FIG. 5B.

Figure 6A:
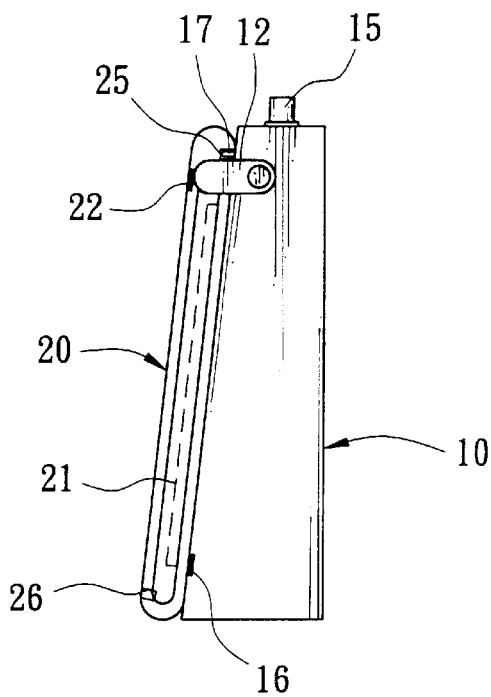
FIGS. 6A, 6B and 6C are side views illustrating the opening of monitor of FIG. 1 respectively.
Figure 6B:
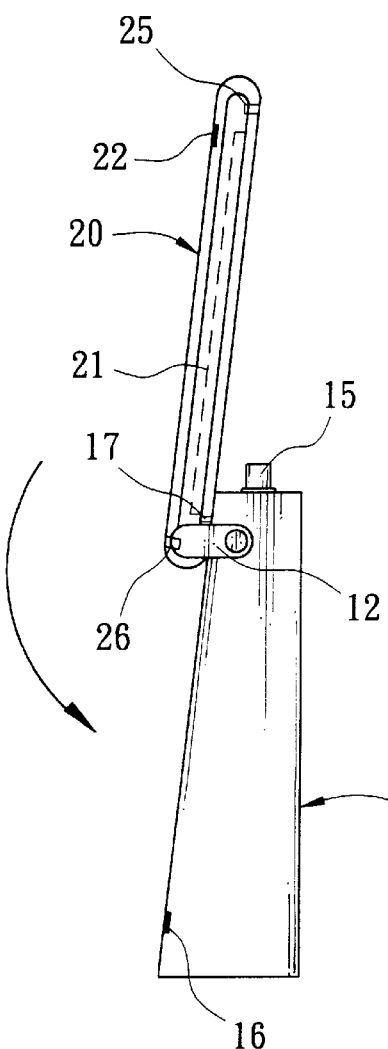
Figure 6C:
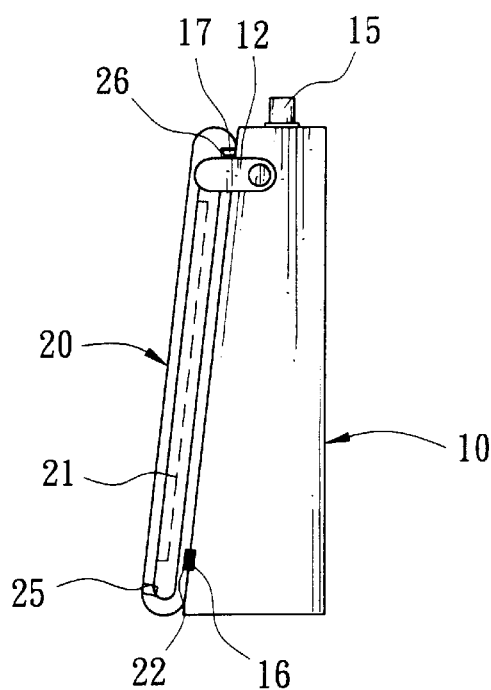

Monitor 20 is an elongate rectangular member and comprises a screen 21 on the front side, a connector 22 on the rear side for electrically coupling to connector assembly 16 of case 10, and grooves 23, 24 on both lateral sides having top ends 231, 241 and bottom ends 232, 242 respectively. Pegs 111 and 121 are inserted in groove 23 and 24 respectively. As such, monitor 20 may be slidably moved between a first position when top ends 231, 241 are engaged with pegs 111, 121 and a second position when bottom ends 232, 242 are engaged with pegs 111, 121. At the first position, the whole monitor 20 is engaged with case 10 with screen 21 of monitor 20 faced the case 10. This first position is called the storage position of monitor 20 (FIG. 6A). Then pull monitor 20 upward until as stated above the bottom ends 232, 242 are engaged with pegs 111, 121 (i.e., the rotation position of monitor 20) (FIG. 6B). Next, counterclockwise swing monitor 20 about the guides 11, 12 until the whole monitor 20 is engaged with case 10 with screen 21 of monitor 20 faced forward (i.e., user). Also, connector 22 of monitor is electrically coupled to connector assembly 16 of case 10. This second position is 20 called the use position of monitor 20 (FIG. 6C). A tab 17 is provided near the top side of case 10. Correspondingly, a first slot 25 is provided below screen 21 and a second slot 26 is provided at the upper portion of the other opposite side of monitor 20. As such, in the use position tab 17 is inserted into second slot 26, while in the storage position tab 17 is inserted into first slot 25 for securing monitor 20 to case 10.

Keyboard 30 is an elongate rectangular member received in recess 13 in the storage position or removed from recess 13 in the use position. A plurality of keys 31 (e.g., alphabet keys, direction keys, numeric keys, and function keys) are provided on keyboard 30. A cable 32 is electrically coupled to case 10. Alternatively, keyboard 30 may be coupled to case 10 by a wireless transmission technique such as infrared or blue tooth. This may eliminate the drawback of cable connection.

Figure 2:
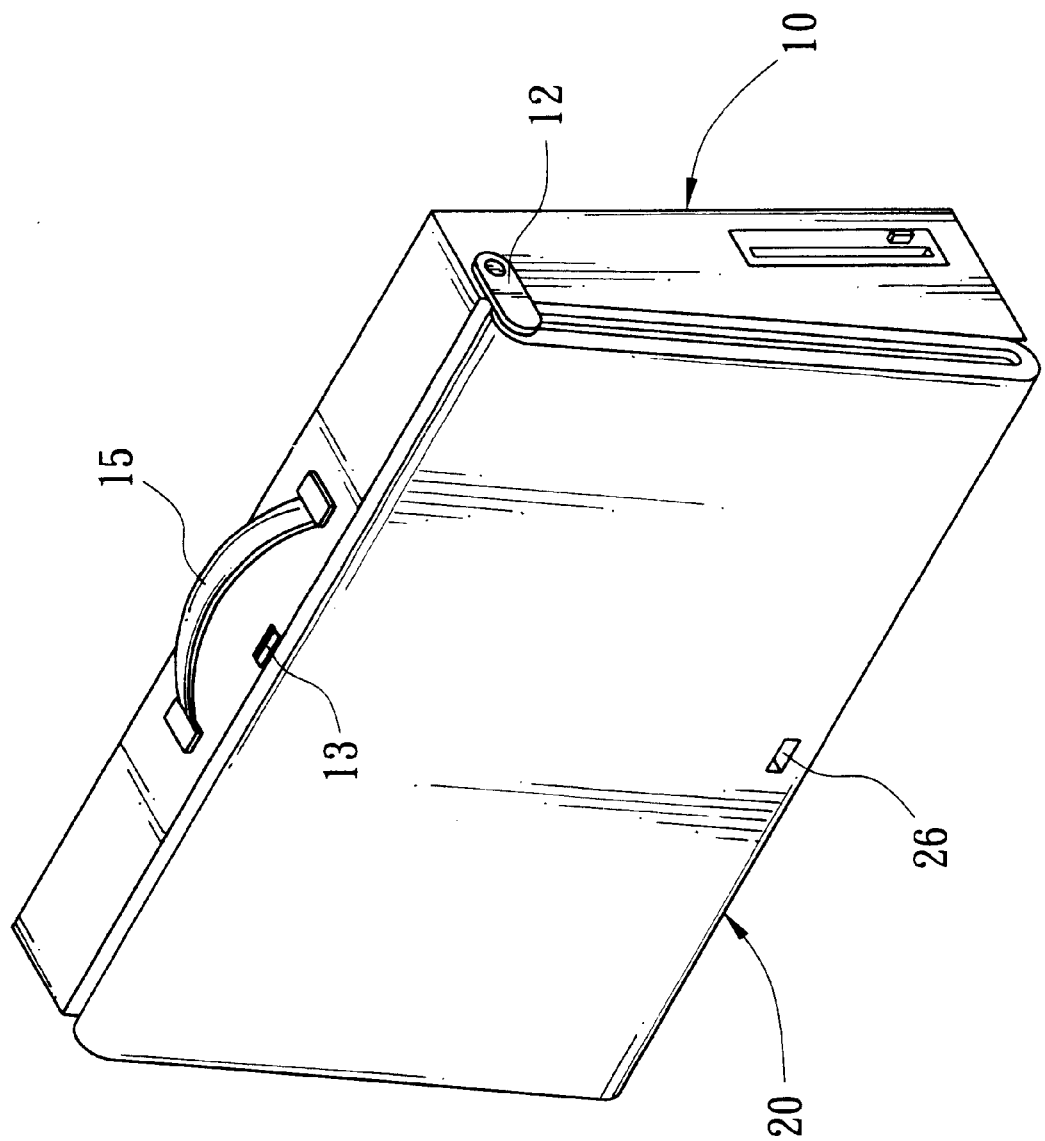
FIG. 2 is a perspective view of the assembled FIG. 1 notebook.
Figure 3:
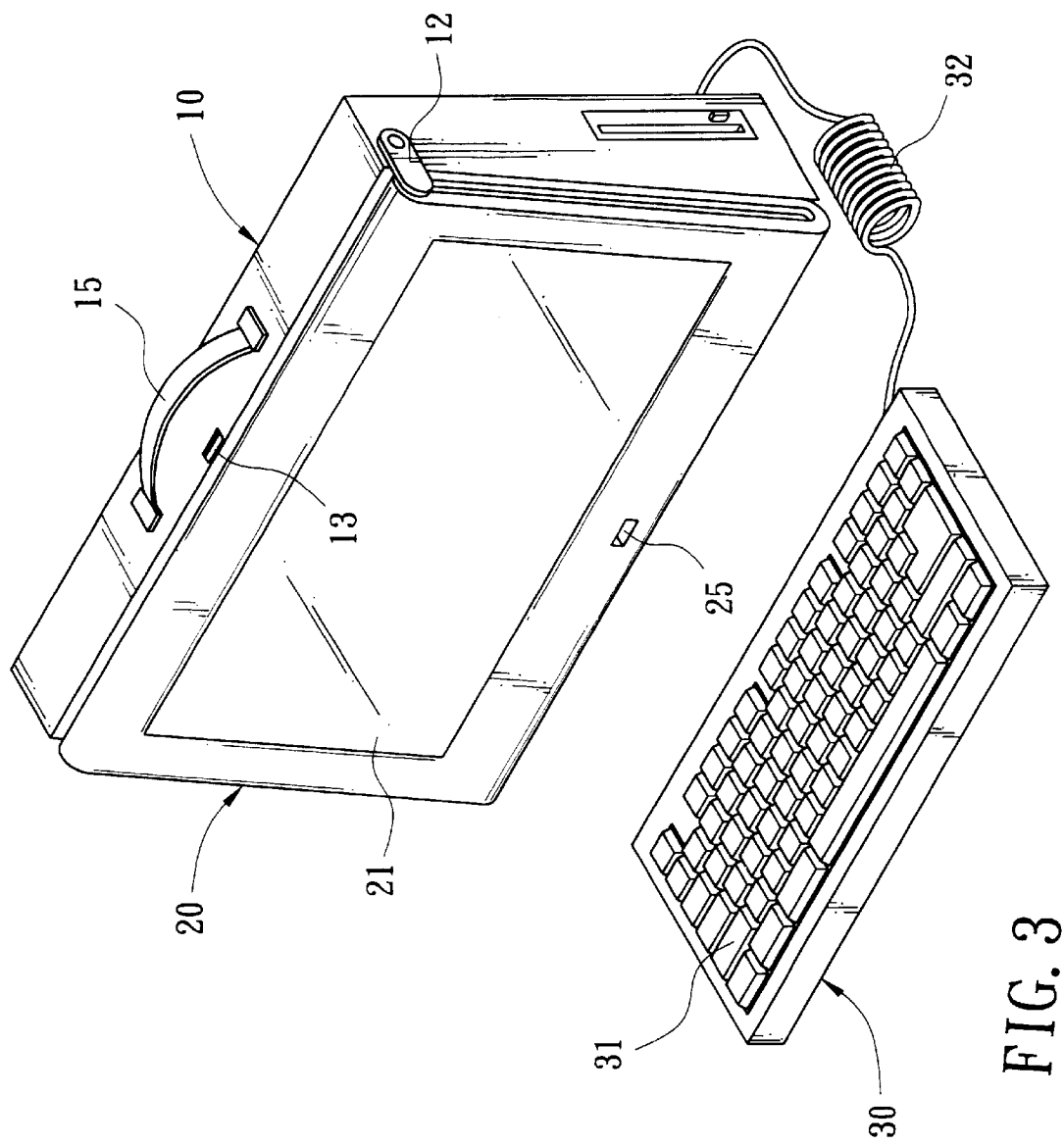
FIG. 3 is a perspective view illustrating the use of the FIG. 2 notebook.

Referring to FIGS. 2, 5A and 6A, glides 41 and 42 are rotated to the storage position and keyboard 30 is received in recess 13. At the storage position, user may store the notebook or lift handle 15 to carry the notebook. Referring to FIGS. 3, 5B, 6B and 6C, a use of the notebook is illustrated. First disengage tab 17 from first slot 25. Then pull monitor 20 upward until being stopped. Next, counterclockwise swing monitor 20 about the guides 11, 12 until the whole monitor 20 is engaged with case 10 with screen 21 of monitor 20 faced forward (i.e., user). Also, connector 22 of monitor 20 is electrically coupled to connector assembly 16 of case 10 for receiving signals from case 10. Thus, message may be shown on screen 21 for viewing. Then remove keyboard 30 after cover 14 is open. Then rotate glides 41 and 42 to the support position (i.e., perpendicular to case 10 and projected from the underside of case 10). As such, case 10 may be stably disposed on a planar surface (e.g., table). Further, as stated above the front side 101 of case 10 is downward slanted such that screen 21 is also slanted for ease of viewing. Furthermore, smaller use space is obtained in use and the blocking of the path of heat dissipation is lifted by such vertically disposed notebook.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A notebook computer comprising:
    a vertically disposed case containing electronic devices for processing and storing data;
    a monitor having a screen, the monitor being parallel slidably coupled to the case and being slidable to either face the case in a storage position or oppose the case and electrically couple to the case in a use position;
    a keyboard having a plurality of keys, the keyboard being receivable into the case or removable from the case; and
    a pair of rotatable glides at the underside, the glides being rotatable to the storage position or to be perpendicular to the case and projected from the underside of the case in a support position.

2. The notebook computer of claim 1, wherein the case has a front side engaged with the monitor being downwardly slanted and a rear side.

3. The notebook computer of claim 1, wherein the case further comprises a carrying handle on the top.

4. The notebook computer of claim 1, wherein the case further comprises a recess at the rear and a cover hinged to the recess.

5. The notebook computer of claim 1, wherein the keyboard further comprises a cable electrically coupled to the case.

6. The notebook computer of claim 1, wherein the keyboard is wirelessly coupled to the case.

7. A notebook computer comprising:
    a vertically disposed case containing electronic devices for processing and storing data;
    a monitor having a screen, the monitor being parallel slidably coupled to the case and being slidable to either face the case in a storage position or oppose the case and electrically couple to the case in a use position, the case having a front side engaged with the monitor being downwardly slanted and a rear side;
    a keyboard having a plurality of keys, the keyboard being receivable into the case or removable from the case; and
    a tab on the case and the monitor further comprises a first slot on the front side and a second slot on the rear side at an elevation different from that of the first slot such that in the use position, the tab is inserted into the second slot or in the storage position the tab is inserted into the first slot both for securing the monitor to the case.

8. The notebook computer of claim 7, wherein the case further comprises a carrying handle on the top.

9. The notebook computer of claim 7, wherein the case further comprises a recess at the rear and a cover hinged to the recess.

10. The notebook computer of claim 7, wherein the keyboard further comprises a cable electrically coupled to the case.

11. The notebook computer of claim 7, wherein the keyboard is wirelessly coupled to the case.

12. A notebook computer comprising:
- a vertically disposed case containing electronic devices for processing and storing data;
- a monitor having a screen, the monitor being parallel slidably coupled to the case and being slidable to either face the case in a storage position or oppose the case and electrically couple to the case in a use position;
- a keyboard having a plurality of keys, the keyboard being receivable into the case or removable from the case; and
- two guides on two opposite sides at the top of the case and two pegs on the guides respectively and the monitor further comprises two grooves on two opposite sides for receiving the pegs so as to slidably engage the monitor with the guides.

13. The notebook computer of claim 12, wherein the case has a front side engaged with the monitor being downwardly slanted an a rear side.

14. The notebook computer of claim 12, wherein the case further comprises a carrying handle on the top.

15. The notebook computer of claim 12, wherein the case further comprises a recess at the rear and a cover hinged to the recess.

16. The notebook computer of claim 12, wherein the case further comprises a pair of rotatable glides at the underside, the glides being rotatable to the storage position or to be perpendicular to the case and projected from the underside of the case in a support position.

17. The notebook computer of claim 12, wherein the keyboard further comprises a cable electrically coupled to the case.

18. The notebook computer of claim 12, wherein the keyboard is wirelessly coupled to the case.

19. The notebook computer of claim 12, wherein each guide has a top end and a bottom end such that the monitor is capable of slidably moving between the storage position when the top ends are engaged with the pegs and the use position when the bottom ends are engaged with the pegs.

20. The notebook computer of claim 19, wherein when the bottom ends are engaged with the pegs the monitor is capable of swinging downward for causing the screen of the monitor to oppose the case in a rotation position.

* * * * *